US012308572B2

(12) United States Patent
Hofmann

(10) Patent No.: US 12,308,572 B2
(45) Date of Patent: May 20, 2025

(54) ELECTRICAL PLUG CONNECTION HAVING A SELF-LOCKING FUNCTION

(71) Applicant: MD ELEKTRONIK GmbH, Waldkraiburg (DE)

(72) Inventor: Thomas Hofmann, Tacherting (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 384 days.

(21) Appl. No.: 17/940,002

(22) Filed: Sep. 8, 2022

(65) Prior Publication Data

US 2023/0093675 A1 Mar. 23, 2023

(30) Foreign Application Priority Data

Sep. 21, 2021 (DE) ..................... 10 2021 124 339.4

(51) Int. Cl.

*H01R 13/629* (2006.01)
*H01R 13/516* (2006.01)
*H01R 13/639* (2006.01)
*H01R 13/64* (2006.01)

(52) U.S. Cl.

CPC ........... *H01R 13/64* (2013.01); *H01R 13/516* (2013.01); *H01R 13/62927* (2013.01); *H01R 13/639* (2013.01)

(58) Field of Classification Search

CPC .................. H01R 13/64; H01R 13/516; H01R 13/62927; H01R 13/639

See application file for complete search history.

(56) References Cited

U.S. PATENT DOCUMENTS

| | | | | |
|---|---|---|---|---|
| 5,234,356 A * | 8/1993 | Maejima | H01R 13/6272 439/352 |
| 5,628,648 A * | 5/1997 | Higgins, Jr. | H01R 13/641 439/372 |
| 11,342,708 B2 * | 5/2022 | Menez | H01R 13/6272 |
| 2012/0282791 A1 | 11/2012 | Brown et al. | |

FOREIGN PATENT DOCUMENTS

| | | |
|---|---|---|
| DE | 3839728 A1 | 6/1989 |
| EP | 3220490 A1 | 9/2017 |
| WO | WO 2021028294 A1 | 2/2021 |

* cited by examiner

*Primary Examiner* — Vanessa Girardi

(74) *Attorney, Agent, or Firm* — LEYDIG, VOIT & MAYER, LTD.

(57) ABSTRACT

An electrical plug connector includes a plug connector housing, a primary locking member and a blocking member. The primary locking member is borne on the plug connector housing to be movable between a locking and an unlocking position and prevents the plug connection from releasing in the locking position and allows it to release in the unlocking position. The blocking member is borne on the plug connector housing to be movable between a blocking and a releasing position and prevents the primary locking member from moving into the unlocking position in the blocking position and allows it to move into the unlocking position in the releasing position. The blocking member is movable from the releasing position into the blocking position by a stop on a mating plug connector housing when the plug connector housing is shifted relative thereto.

15 Claims, 4 Drawing Sheets

ELECTRICAL PLUG CONNECTION HAVING A SELF-LOCKING FUNCTION

CROSS REFERENCE TO RELATED APPLICATIONS

This application claims benefit to German Patent Application No. DE 10 2021 124 339.4, filed on Sep. 21, 2021, which is hereby incorporated by reference herein.

FIELD

The present invention relates to an electrical plug connector. The invention further relates to a mating electrical plug connector that can be connected to the plug connector to establish a plug connection, and to a corresponding plug connection system.

BACKGROUND

An electrical plug connection system as used, for example, to establish electrically conductive connections between components of a motor vehicle may comprise a plug connector and a mating plug connector that can be latched together by means of a primary locking device so as to prevent the plug connection from inadvertently releasing. As a further safety measure, the primary locking device may be blocked in a particular position using an additional component that is generally moved into position manually; this is also referred to as connector position assurance (CPA).

Moreover, the plug connection system may comprise a secondary locking device that ensures that the plug connector and the mating plug connector can be fully plugged together, i.e., latched together by means of the primary locking device, only when one or more electrically conductive contact members, for example in the form of outer conductors, have been correctly positioned in the plug connector and mating plug connector. A secondary locking device of this kind may also be used to secure the contact member(s) against slipping in the plug connector and mating plug connector.

SUMMARY

In an embodiment, the present invention provides an electrical plug connector comprising a plug connector housing, a primary locking member and a blocking member. The plug connector housing is configured to receive at least one electrically conductive contact member, and is connectable to a mating plug connector housing of a mating electrical plug connector by shifting the plug connector housing relative to the mating plug connector housing to establish a plug connection. The primary locking member is borne on the plug connector housing so as to be movable between a locking position and an unlocking position and is configured to prevent the plug connection from releasing in the locking position and to allow the plug connection to release in the unlocking position. The blocking member is borne on the plug connector housing so as to be movable between a blocking position and a releasing position and is configured to prevent the primary locking member from moving into the unlocking position in the blocking position and to allow the primary locking member to move into the unlocking position in the releasing position. The blocking member is movable from the releasing position into the blocking position by a stop on the mating plug connector housing when the plug connector housing is shifted relative to the mating plug connector housing

BRIEF DESCRIPTION OF THE DRAWINGS

Subject matter of the present disclosure will be described in even greater detail below based on the exemplary figures. All features described and/or illustrated herein can be used alone or combined in different combinations. The figures are merely schematic representations and are not to scale. Identical reference numerals denote identical or identically functioning features in the various drawings. The features and advantages of various embodiments will become apparent by reading the following detailed description with reference to the attached drawings, which illustrate the following.

DETAILED DESCRIPTION

Figure 1:
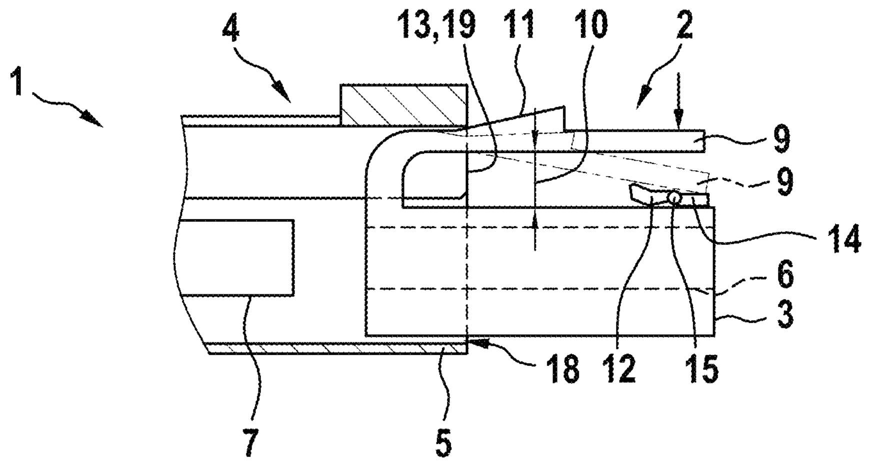
FIG. 1 is a side view of an electrical plug connection system according to an embodiment example of the invention in the unlatched state.

In an embodiment, the present invention provides an electrical plug connection that does not require any additional, for example manual, assembly step to block the primary locking device.

A first embodiment of the invention provides an electrical plug connector. The plug connector comprises a plug connector housing for receiving at least one electrically conductive contact member, wherein the plug connector housing can be connected to a mating plug connector housing of a mating electrical plug connector to establish a plug connection. In addition, the plug connector comprises a primary locking member, which is borne on the plug connector housing so as to be movable between a locking position and an unlocking position and is configured to prevent the plug connection from releasing when in the locking position and to allow it to do so when in the unlocking position, and a blocking member, which is borne on the plug connector housing so as to be movable between a blocking position and a releasing position and is configured to prevent the primary locking member from moving into the unlocking position when in the blocking position and to allow it to do so when in the releasing position. In this case, the blocking member is configured to be moved from the releasing position into the blocking position when the plug connector housing is shifted relative to the mating plug connector housing, by means of a stop on the mating plug connector housing.

A second embodiment of the invention provides a mating electrical plug connector. The mating plug connector comprises a mating plug connector housing for receiving at least one electrically conductive mating contact member, wherein the mating plug connector housing can be connected to the plug connector housing of the plug connector as described above and below to establish the plug connection by shifting the mating plug connector housing relative to the plug connector housing, and comprises a stop configured to move the blocking member of the plug connector from the releasing position into the blocking position when the mating plug connector housing is shifted relative to the plug connector housing.

A third embodiment of the invention provides an electrical plug connection system. The plug connection system comprises a plug connector as described above and below, and a mating plug connector housing as described above and below, wherein the plug connector housing of the plug connector and the mating plug connector housing of the mating plug connector are connected to establish the plug connection. The plug connection system further comprises at least one electrically conductive contact member received by the plug connector housing, and at least one electrically conductive mating contact member received by the mating plug connector housing, wherein the contact member and the mating contact member are interconnected in an electrically conductive manner. In the process, the primary locking member of the plug connector is in the locking position to prevent the plug connection from releasing, and the stop of the mating plug connector housing holds the blocking member of the plug connector in the blocking position to prevent the primary locking member from moving into the unlocking position.

Without limiting the scope of the invention in any way, embodiments of the invention may, inter alia, be based on the concepts, features and knowledge described in the following.

As mentioned at the outset, special housing locks (also referred to as CPA) may be used in plug connector assemblies that are common in, for example, the automotive industry. They serve to ensure that the housing of the plug connector or mating plug connector is properly connected to the relevant electrical contacts. The position of the housing lock may be secured using a locking member, which generally has to be moved into a corresponding locking position by hand after the plugging operation; this represents an additional step during assembly and also requires a certain degree of training as the housing locks are often very delicate.

Using the approach described above and below, the assembly of the plug connection can be considerably simplified in that the housing lock is moved into the desired position by the plugging operation itself. An additional assembly step after the plugging operation can thus be omitted, in particular an additional manual assembly step, which may accordingly be time-consuming and prone to error.

By way of example, this can be done by a hingedly borne lock geometry being deflected by the plugging operation, which geometry in turn locks a primary latching hook of the plug connection. To release the locking, the lock geometry may, for example, be moved counter to a plugging direction into a position in which the lock geometry is no longer blocking the path of the primary latching hook, such that the hook can be actuated again. Alternatively, the lock geometry may also be simply withdrawn from the relevant housing in order to release the locking. The lock geometry may be moved into position and removed using a tool, for example a screwdriver, and/or by hand.

A “contact member” and “mating contact member” may, for example, be understood to be a pin-like and/or bush-like metal conductor that can be connected to a cable in an electrically conductive manner. By way of example, the contact member and mating contact member may comprise an outer conductor and an inner conductor arranged coaxially therewith. The contact member and mating contact member may be insertable into one another, for example.

The primary locking member may be configured to interact frictionally and/or interlockingly with an accordingly shaped latching portion of the mating plug connector housing when in the locking position so as to prevent the plug connection from separating. In the unlocking position, the primary locking member may, for example, be fully moved out of the latching portion.

The movements of the primary locking member and of the blocking member may be suitably coordinated with one another in time so as to ensure that the blocking member blocks the primary locking member only when the primary locking member is latched in the mating plug connector housing.

It is not entirely necessary for the blocking member in the blocking position to prohibit all movement of the primary locking member. For example, slight movement of the primary locking member toward the unlocking position may still be possible in the blocking position as long as it is ensured that the primary locking member cannot be moved as far as into the unlocking position.

In principle, the primary locking member is blocked firstly by the blocking member in the blocking position abutting the primary locking member, which is in the locking position, or blocking at least part, in particular a large portion, of the possible movement range thereof, and secondly by the blocking member being supported against the stop on the mating plug connector housing and against the plug connector housing. For example, the blocking member may be configured to be folded away outward by the stop, which moves together with the mating plug connector housing, i.e., configured to stand proud, and thus configured to restrict the possible movement range of the primary locking member. For this purpose, the stop and the blocking member may be configured having corresponding complementary contact surfaces on which the stop and the blocking member touch each other. One or both of the contact surfaces may, for example, be oriented obliquely to a shift axis on which the plug connector housing can be shifted relative to the mating plug connector housing to establish the plug connection.

By way of example, the blocking member may be borne so as to be rotatable about an axis of rotation oriented transversely or obliquely to the aforementioned shift axis.

In addition, the blocking member may be configured to exert a supportive force on the primary locking member when the blocking member is moved from the releasing position into the blocking position by means of the stop, for example in order to move the primary locking member from the unlocking position into the locking position and/or to hold it in the locking position.

According to one embodiment, the blocking member may be borne on the plug connector housing so as to be rotatable between the blocking position and the releasing position. In this case, the blocking member may be rotatably borne on the plug connector housing, for example on the outer surface thereof, either indirectly, for instance by means of a joint member and/or fastening member, as described in more detail below, or directly. By way of example, the blocking member may be rotatably borne on the plug connector housing at its first end while its other, free end may project a certain distance from the plug connector housing in the blocking position. This distance may, for example, be reduced accordingly by moving the blocking member back into the releasing position. The blocking member may be configured to be moved from the releasing position into the blocking position by means of the stop and additionally to be held in the blocking position. This may prevent the blocking member from moving back into the releasing position, for example when attempts are made to move the primary locking member into the unlocking position once the plug connector housing has been latched to the mating plug connector housing. It is possible that the stop on the mating plug connector housing presses the blocking member in the blocking position against the primary locking member. As mentioned above, when in the blocking position the blocking member may also be separated from the primary locking member by a small gap, i.e., it need not necessarily abut the primary locking member when in the blocking position.

According to one embodiment, the blocking member may comprise a blocking portion for blocking the primary locking member, and an actuation portion, which is connected to the blocking portion, for actuating the blocking member. In this case, the blocking portion may be arranged in a gap between the primary locking member and the plug connector housing. By contrast, the actuation portion may be arranged outside the gap and, when the plug connector housing is shifted relative to the mating plug connector housing, may be rotated from the releasing position into the blocking position by means of the stop on the mating plug connector housing. The blocking portion and the actuation portion may be interconnected such that both a rotational movement of the actuation portion can be transmitted to the blocking portion, and also the blocking portion can resiliently twist to some extent relative to the actuation portion. As a result, the blocking portion and actuation portion may be simultaneously deflected to different extents without being damaged. For example, the gap may become smaller when the primary locking member is moved into the unlocking position and larger when the primary locking member is moved into the locking position. In other words, when in the blocking position, the blocking member, or more precisely the blocking portion, may serve to block the gap at least in part when the primary locking member is in the locking position. The blocking member may be actuated from outside the gap using the actuation portion.

According to one embodiment, the blocking member may be fork-shaped having two outer prongs as the actuation portion and a middle prong between the two outer prongs as the blocking portion. In other words, the blocking member may be actuatable on both sides by means of the stop in order to be moved from the releasing position into the blocking position. Tilting or twisting of the blocking member, as might occur when it is actuated from one side by means of the stop, can thus be prevented. It is possible to configure the stop in two parts in accordance with the fork shape of the blocking member. For example, the stop may comprise two separate stop members, for instance in the form of two ribs or projections that each actuate one of the outer prongs.

According to one embodiment, the plug connector may further comprise a fastening member and a joint member. In this case, the fastening member may be fastened to the plug connector housing and the blocking member may be borne on the fastening member so as to be rotatable between the blocking position and the releasing position by means of the joint member.

The blocking member, fastening member, and joint member may be separately manufactured components or different functional portions of one and the same single-piece individual part, for example of an injection-molded part or an additively manufactured part.

By way of example, the fastening member may comprise a receptacle for a tool and/or a retaining portion for gripping or holding the fastening member using one or more fingers. It is expedient for the fastening member to be accessible from the exterior even if the plug connector housing is connected to the mating plug connector housing to establish the plug connection. By way of example, the blocking member may be removable together with the fastening member or together with the fastening member and the joint member. It is also possible for the blocking member to be movable away from the primary locking member by displacing the fastening member on the plug connector housing accordingly, such that the primary locking member can be moved back into the unlocking position. In this way, the blocking of the primary locking member can be released as necessary with little effort.

In the simplest case, the joint member may be a connection portion that can be bent using relatively little force and by means of which the blocking member is connected to the fastening member. However, it is also possible for a joint member to be in the form of a mechanical joint. In addition, the joint member may be configured to exert a spring force on the blocking member. In this case, the spring force may, for example, act toward the blocking position when the blocking member is in the releasing position, or toward the releasing position when the blocking member is in the blocking position. In this way, the force required to move the blocking member into the blocking or releasing position can be reduced.

According to one embodiment, the joint member may be a film hinge. By way of example, a “film hinge” may be understood as a flexible strip that connects the blocking member to the fastening member. The film hinge may be made of plastics material and/or a metal material. A joint member of this kind can be produced particularly cost-effectively.

According to one embodiment, the fastening member may be releasably fastened to the plug connector housing by means of a latching mechanism. Additionally or alternatively, the fastening member may be fastenable to the plug connector housing in different positions by means of the latching mechanism. This allows the fastening member and the blocking member, which is connected to the fastening member by means of the joint member, to be assembled (and disassembled) and/or adjusted quickly and simply.

According to one embodiment, the plug connector may comprise a secondary locking device, which is configured to cause the plug connector housing to be connectable to the mating plug connector housing to establish the plug connection only when the contact member received by the plug connector housing is arranged in a predetermined position in and/or on the plug connector housing. Assembly errors can be avoided in this way.

By way of example, the secondary locking device may comprise at least one secondary locking member that is borne on the plug connector housing so as to be movable between a secondary locking position and a secondary unlocking position; when in the secondary locking position said secondary locking member may protrude into the plug connector housing in part in order to secure the contact member, which is received therein, and when in the secondary unlocking position it allows the contact member to be positioned in the plug connector housing. The secondary locking member may, for example, be movable into the secondary locking position only when the contact member has been inserted into the plug connector housing in its entirety, for example as far as the stop. In addition, when in the secondary unlocking position the secondary locking member may protrude in part beyond an outer contour of the plug connector housing such that the plug connector housing is prevented from being fully connected to the mating plug connector housing, and when in the secondary locking position the secondary locking member may not protrude beyond the outer contour such that the plug connector housing can be fully connected to the mating plug connector housing. For example, the secondary locking device may comprise one such secondary locking member for each contact member to be received by the plug connector housing.

According to one embodiment, the fastening member may be additionally fastened to the secondary locking device. The assembly (and disassembly) of the plug connector can be further simplified in this way. For example, the blocking member and the secondary locking device may be different (functional) portions of one and the same single-piece individual part, for example of an injection-molded part or an additively manufactured part.

According to one embodiment, the primary locking member may be formed as a resiliently bendable arm that may be fastened, at one of its ends, to the plug connector housing and movable between the locking position and the unlocking position as a result of its other, free end bending in a resilient manner. For example, the primary locking member and the plug connector housing may have been produced in one piece and/or made of the same material(s) in an injection-molding process or an additive manufacturing process. The plug connector can thus be supplied particularly cost-effectively. However, the primary locking member may also have been supplied as a separate component and suitably connected to the plug connector housing later on.

According to one embodiment, the primary locking member may be resiliently bent in the unlocking position such that a spring force directed toward the locking position acts on the primary locking member. In other words, the primary locking member may be preloaded in the unlocking position such as to revert to the locking position by itself when let go, unless it is otherwise prevented from doing so. Additionally or alternatively, the primary locking member may not be resiliently bent when in the locking position. In other words, the locking position may correspond to a resting position of the primary locking member, in which the primary locking member is not subjected to any significant load, in particular no significant flexural load.

According to one embodiment, a free end of the primary locking member may project further from the plug connector housing in the locking position than in the unlocking position. For example, the primary locking member may be movable into the unlocking position by pushing the free end down, i.e., by moving it toward the plug connector housing, and may be movable back into the locking position by letting the primary locking member go. This can simplify the assembly of the plug connection. Additionally or alternatively a free end of the blocking member may project further from the plug connector housing in the blocking position than in the releasing position. In this way, the primary locking member may be kept at a distance from the plug connector housing.

According to one embodiment, the mating plug connector housing may comprise a housing opening for receiving at least a portion of the plug connector housing, and the stop may be arranged at least in part in the housing opening. In this way, the blocking member may be moved from the releasing position into the blocking position when the plug connector housing is inserted into the mating plug connector housing. Additionally or alternatively, the stop may be rib-like. For example, the stop may comprise two or more ribs that may each extend in the longitudinal direction of the mating plug connector housing in parallel axes. In this case, the ribs may be opposite one another at least in part and be separated from one another by a space that may be used to receive at least one portion of the primary locking member and/or of the blocking member and/or of other members of the plug connector. By way of example, the ribs may at their end face each have a specifically formed actuation surface for actuating the blocking member. In this case, the actuation surface may be oriented obliquely to the longitudinal direction of the rib in question. For example, the actuation surface may be formed by a chamfer on the relevant end face. A stop of this kind is sturdy and simple to produce.

Figure 2:
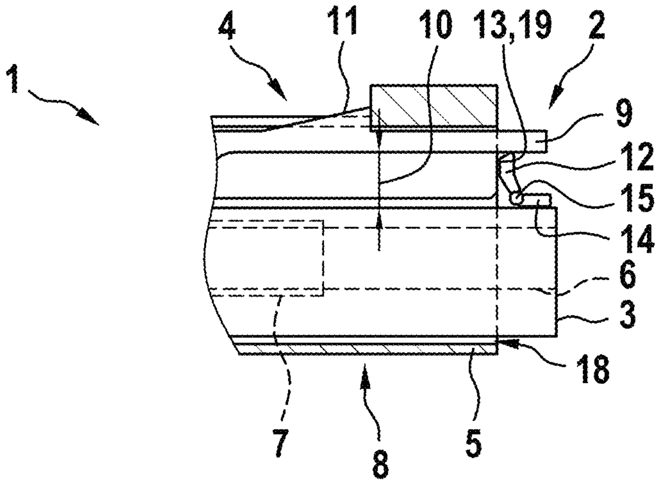
FIG. 2 is a side view of the plug connection system from FIG. 1 in the latched state.
Figure 3:
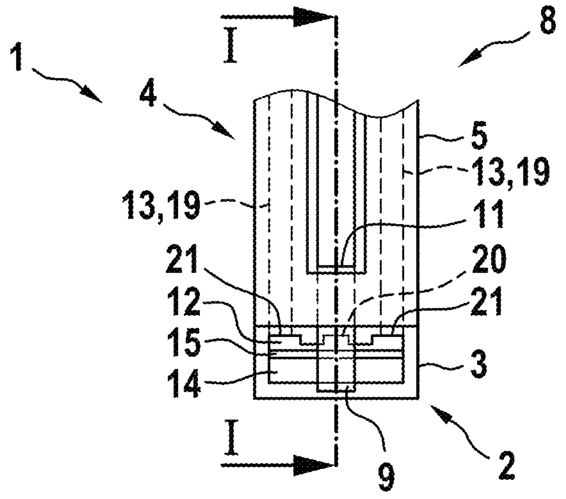
FIG. 3 is a plan view of the plug connection system from FIG. 2.

FIG. 1 shows an electrical plug connection system 1 comprising an electrical plug connector 2 having a plug connector housing 3, and a mating electrical plug connector 4 having a mating plug connector housing 5. In FIG. 1 and FIG. 2, the mating plug connector housing 5 is shown in cross section according to a section line I-I indicated in FIG. 3. In the plug connector housing 3 there is arranged an electrically conductive contact member 6, which is to be connected, in an electrically conductive manner, to an electrically conductive mating contact member 7 received by the mating plug connector housing 5. For this purpose, the plug connector housing 3 and the mating plug connector housing 5 are connected to establish a plug connection 8 by being shifted relative to one another in opposite directions, as shown in FIG. 2 and FIG. 3 (in FIG. 1, the plug connection system 1 is only plugged together to a certain extent, i.e., is not yet fully plugged together). In this case, the contact member 6 and the mating contact member 7 may be inserted into one another in part.

The plug connection system 1 may also comprise two or more contact members 6 or mating contact members 7.

The plug connector 2 further comprises a primary locking member 9, which is borne on the plug connector housing 3 so as to be movable between a locking position and an unlocking position. The depictions of the primary locking member 9 indicated by solid lines in FIG. 1, FIG. 2, and FIG. 3 each illustrate the locking position; the depiction of the primary locking member 9 indicated by dashed lines in FIG. 1 illustrates the unlocking position.

As can be seen in FIG. 2, the plug connector housing 3 and the mating plug connector housing 5 are latched together by way of the primary locking member 9 in the locking position such that the plug connection 8 can no longer be readily released.

In this example, the primary locking member 9 is configured as an arm that projects away from the plug connector housing 3 and is fastened at its first end to the plug connector housing 3 in a resiliently bendable manner, while its second, free end is separated from the plug connector housing 3 by a gap 10. By exerting a bending force (indicated by a downwardly pointing arrow in FIG. 1) on the second end, the primary locking member 9 may be moved from the locking position into the unlocking position, upon which the gap 10 is accordingly reduced. In the unlocking position, it is possible to plug the plug connector housing 3 and the mating plug connector housing 5 into one another entirely, for example as far as a stop, and to separate them again.

In the unlocking position, therefore, a spring force counter to the bending force, i.e., directed toward the locking position, acts on the primary locking member 9 such that the primary locking member 9 reverts to the locking position by itself when let go, unless it is otherwise blocked. In this case, the locking position may correspond to a neutral or resting position of the primary locking member 9.

Alternatively, the primary locking member 9 may also be borne on the plug connector housing 3 so as to be rotatable between the unlocking position and the locking position by means of a mechanical joint. In this case, the aforementioned spring force may be applied by means of an additional spring, for example.

As can be seen in FIG. 1 and FIG. 2, the primary locking member 9 may, by way of example, have a latching wedge 11 between its first end and its second end, said latching wedge sliding over a front edge of the mating plug connector housing 5 when the plug connector housing 3 and the mating plug connector housing 5 are brought together. The effect of this is that the more the primary locking member 9 is bent toward the plug connector housing 3 transversely to a shift axis on which the plug connector housing 3 and the mating plug connector housing 5 are brought together, the more the plug connector housing 3 and the mating plug connector housing 5 are brought together.

The plug connector housing 3 and the mating plug connector housing 5 may, for example, be brought together until such a point as the latching wedge 11 latches by itself in an accordingly shaped portion of the mating plug connector housing 5 owing to the preload of the resiliently bent primary locking member 9 (see FIG. 2). The resulting plug connection 8 may then be released only by moving the primary locking member 9 back into the unlocking position by applying force, for example by pushing its free end down.

To prevent this, for example for safety reasons, the plug connection system 1 comprises a blocking device having a blocking member 12, which is borne on the plug connector housing 3 so as to be movable, in this case rotatable, between a releasing position as shown in FIG. 1 and a blocking position as shown in FIG. 2. In this case, the blocking member 12 can be moved between the releasing position and the blocking position by means of a stop 13 on the mating plug connector housing 5 by shifting the stop 13 together with the mating plug connector housing 5 relative to the plug connector housing 3. In this case, the blocking member 12 is entrained by the stop 13 and thus rotated from the releasing position into the blocking position. In addition, the stop 13 prevents the blocking member 12 from rotating back into the releasing position once it is in the blocking position. As can be seen from FIG. 1 and FIG. 2, the blocking member 12 may project further from the plug connector housing 3 in the blocking position than in the releasing position.

The blocking member 12 in the blocking position blocks a large portion of the gap 10 such that the primary locking member 9 can no longer be pushed down from the locking position into the unlocking position. In the releasing position, however, the gap 10 is largely open, so the primary locking member 9 can be pushed down as far as into the unlocking position.

In this example, the blocking device additionally comprises a fastening member 14, which is fastened to an outer surface of the plug connector housing 3, and a joint member 15, by means of which the blocking member 12 is borne on the fastening member 14 so as to be rotatable between the releasing position and the blocking position. The joint member 15 may be a film hinge, for example. However, a mechanical joint is also possible.

Optionally, the fastening member 14 may be releasably fastened to the plug connector housing 3 by means of a latching mechanism. In the example shown in FIG. 6 and FIG. 7, the latching mechanism comprises a plurality of protrusions 16 on an underside facing the plug connector housing 3, which protrusions can latch into corresponding recesses in the plug connector housing 3, and comprises a suitable spring geometry 17 configured to push the protrusions 16 into the recesses and thus bring about latching to the plug connector housing 3. In this case, the latching may be released by pushing the spring geometry 17 down toward the plug connector housing 3 such that the fastening member 14 may be withdrawn from the plug connector housing 3 together with the joint member 15 and the blocking member 12 (see FIG. 4).

The fastening member 14 may be latchable to the plug connector housing 3 in one or more positions. For example, the fastening member 14 may be latchable to the plug connector housing 3 in different positions in the longitudinal direction of the plug connector housing 3.

Therefore, the plugging operation alone causes the primary locking member 9 to be moved initially from the locking position into the unlocking position and then from the unlocking position back into the locking position and to be blocked in the locking position at the end of the plugging operation. A self-locking function of this kind makes assembling the plug connection system 1 simpler since the primary locking member 9 need not be specifically pushed into the unlocking position, for example with a thumb, and no additional manual step is needed in order to lock the latched primary locking member 9.

In this example, the plug connector housing 3 is partly inserted into a housing opening 18 in the mating plug connector housing 5 in order to establish the plug connection 8. In this case, the stop 13 may be arranged at least in part in the housing opening 18.

For example, the stop 13 may comprise two parallel ribs 19 that each extend in the longitudinal direction of the mating plug connector housing 5 and each terminate at the front edge of the mating plug connector housing 5 (see FIG. 3). The two ribs 19 may be arranged at a particular distance from one another such that the primary locking member 9 can be inserted at least in part into a space between the two ribs 19 during plugging.

According to this arrangement, the blocking member 12 may comprise a blocking portion 20, arranged in the gap 10, for blocking the primary locking member 9, and an actuation portion 21, arranged outside the gap 10 on both sides, for actuating the blocking member 12 through each one of the two ribs 19.

Figure 6:
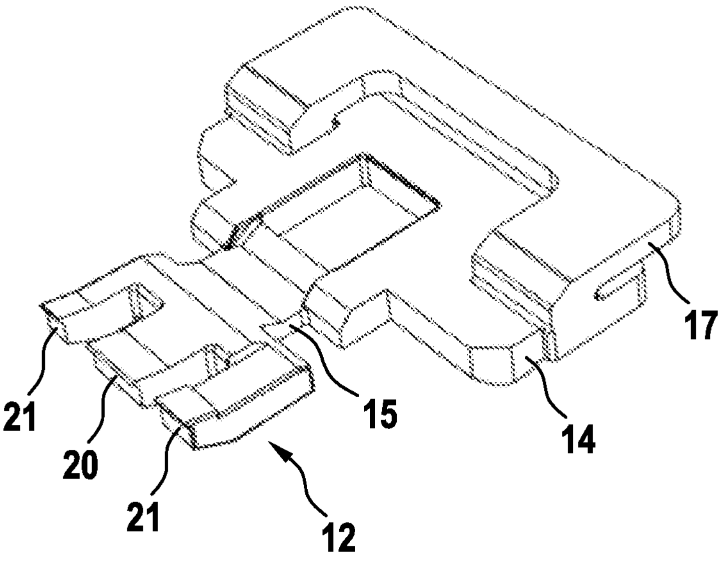
FIG. 6 is a perspective view of a blocking device from FIG. 4 and FIG. 5.
Figure 7:
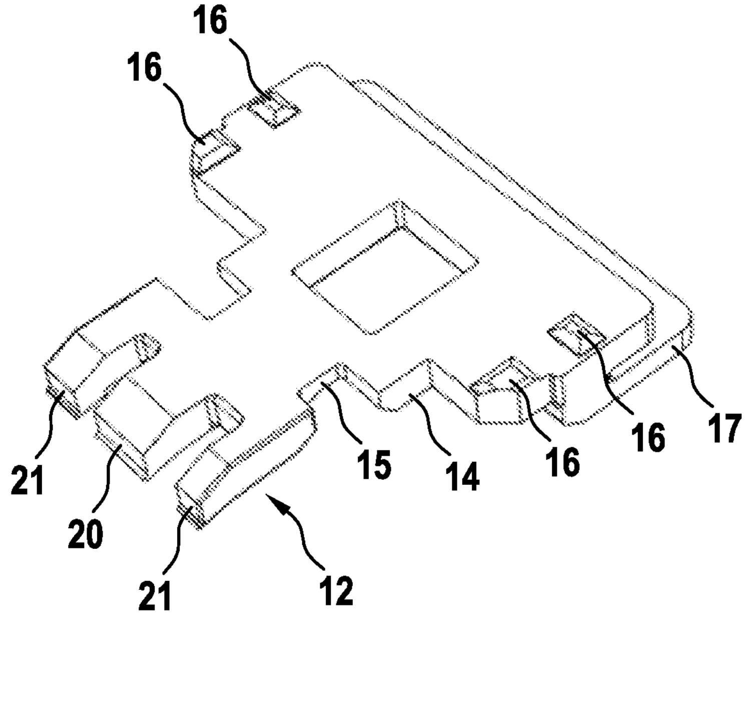
FIG. 7 shows the blocking device from FIG. 6 from below.
Figure 9:
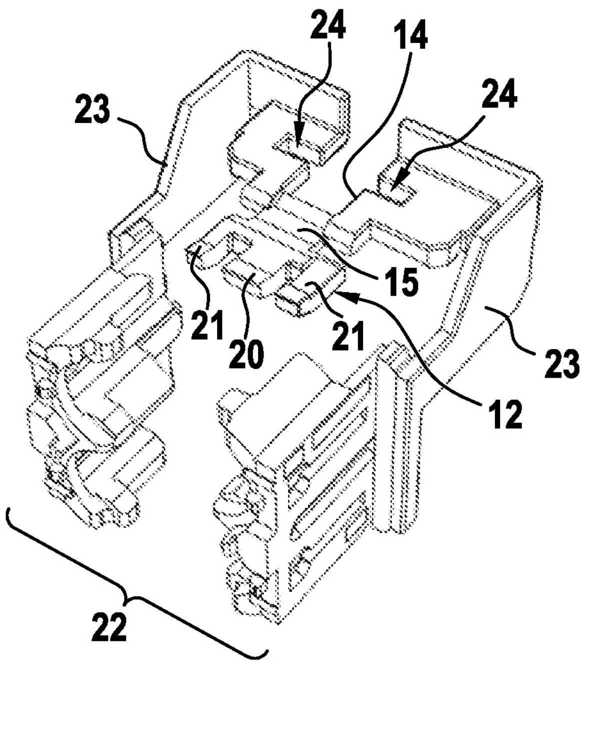
FIG. 9 is a perspective view of a secondary locking device from FIG. 8.

As can be clearly seen in FIG. 6, FIG. 7, and FIG. 9, the blocking portion 20 and the actuation portion 21 may, for example, be formed similarly to the prongs of a fork, the actuation portion 21 representing two outer prongs of the fork and the blocking portion 20 representing a middle prong of the fork located between the two outer prongs.

Figure 4:
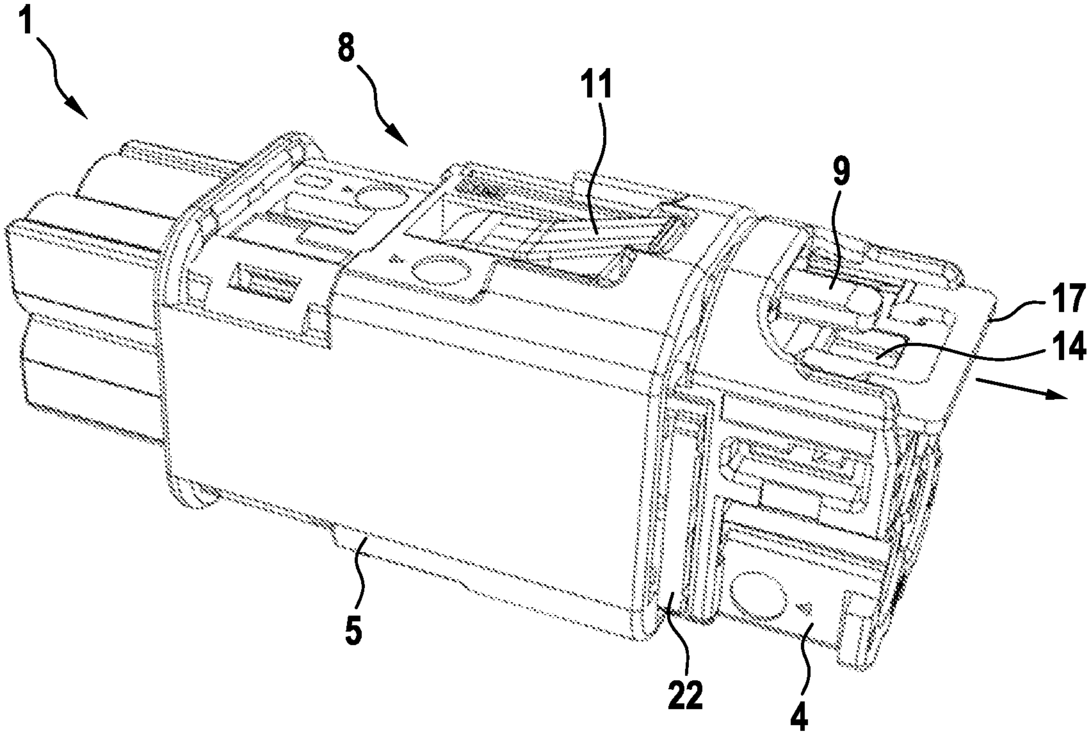
FIG. 4 is a perspective view of an electrical plug connection system according to an embodiment example of the invention in the latched state.
Figure 5:
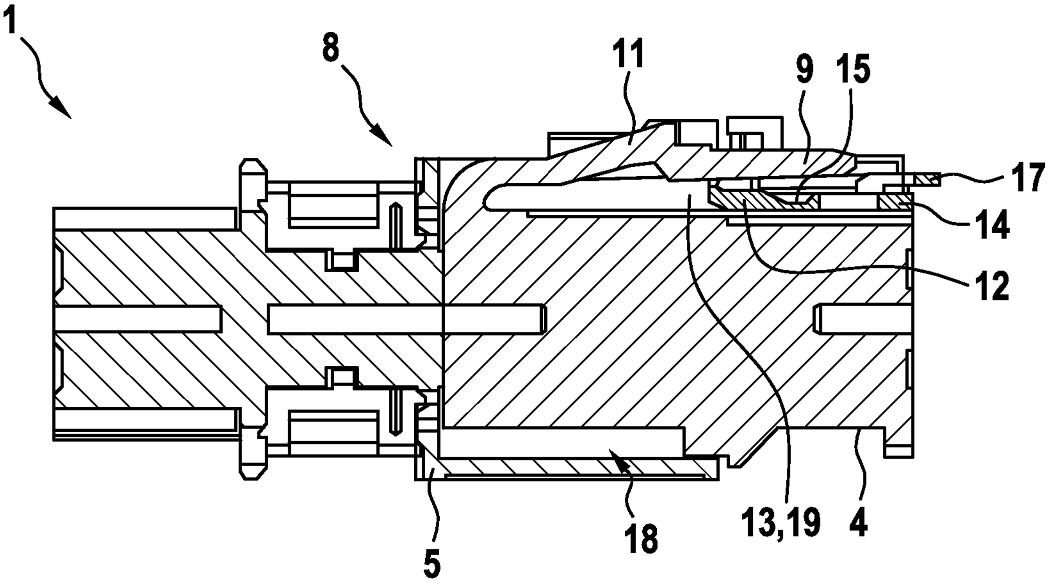
FIG. 5 is a cross-sectional view of the plug connection system from FIG. 4.
Figure 8:
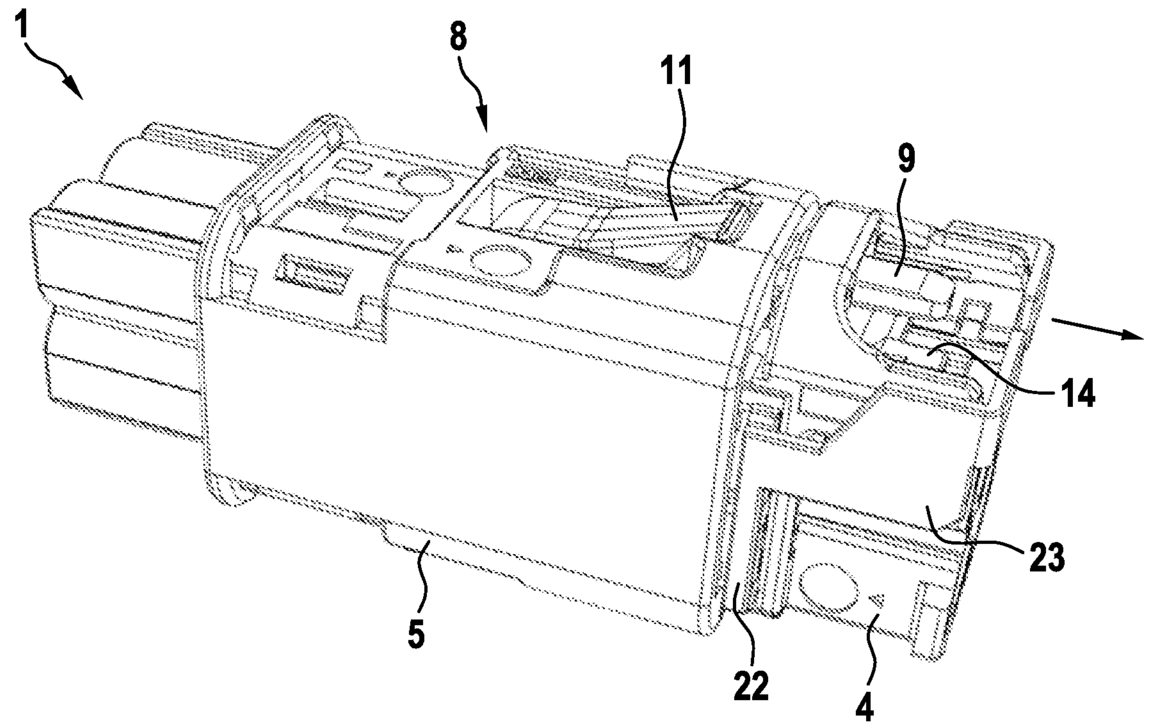
FIG. 8 is a perspective view of an electrical plug connection system according to an embodiment example of the invention in the latched state.

As shown in FIG. 4, FIG. 8, and FIG. 9, the plug connector 2 may optionally comprise a secondary locking device 22 that is configured to secure the contact member(s) 6 in the plug connector housing 3 or to prevent the plug connection 8 from being established when the contact member(s) 6 is/are incorrectly fitted in the plug connector housing 3.

The secondary locking device 22 may be configured as a component that can be assembled (and disassembled) independently of the blocking device, as can be seen in FIG. 4 by way of indication.

Alternatively, the secondary locking device 22 and the blocking device may be configured as different (functional) portions of one and the same one-piece component, for example an injection-molded part or an additively manufactured part, as shown in FIG. 8 and FIG. 9.

For example, the secondary locking device 22 may be fastened to the fastening member 14 on both sides by means of corresponding connecting pieces 23 such that the secondary locking device 22 and the fastening member 14 (and the blocking member 12 connected thereto) can only be assembled (and disassembled) together.

Optionally, the fastening member 14 may comprise a tool receptacle 24, for example in the form of a slot, as can be seen in FIG. 9. The tool receptacle 24 may be used to move and/or deform the fastening member 14 by means of a tool, for example a flat head screwdriver, in such a way that the blocking member 12 is moved out of the blocking position and the primary locking member 9 can thus be pushed back down into the unlocking position.

For example, the fastening member 14 may be withdrawn from the plug connector 2 by hand or using a tool in an arrow direction indicated in FIG. 4 and FIG. 8.

Depending on the configuration, the entire blocking device and/or the entire secondary locking device 22 may be removed from the plug connector 2 together with the fastening member 14.

Lastly, it should be noted that terms such as "having," "comprising," etc., do not exclude other elements or steps, and terms such as "a," "an," or "one" do not exclude a multiplicity. Moreover, it is pointed out that features or steps that have been described with reference to one of the above embodiment examples may also be used in combination with other features or steps of other above-described embodiment examples. Reference numerals in the claims should not be construed as limiting.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Plug connection system
2 Plug connector
3 Plug connector housing
4 Mating plug connector
5 Mating plug connector housing
6 Contact member
7 Mating contact member
8 Plug connection
9 Primary locking member
10 Gap
11 Latching wedge
12 Blocking member
13 Stop
14 Fastening member
15 Joint member
16 Protrusion
17 Spring geometry
18 Housing opening
19 Rib
20 Blocking portion
21 Actuation portion
22 Secondary locking device
23 Connecting piece
24 Tool receptacle

What is claimed is:

1. An electrical plug connector, comprising:

a plug connector housing configured to receive at least one electrically conductive contact member, wherein the plug connector housing is connectable to a mating plug connector housing of a mating electrical plug connector by shifting the plug connector housing relative to the mating plug connector housing to establish a plug connection;

a primary locking member, which is borne on the plug connector housing so as to be movable between a locking position and an unlocking position and is configured to prevent the plug connection from releasing in the locking position and to allow the plug connection to release in the unlocking position; and a blocking member, which is borne on the plug connector housing so as to be movable between a blocking position and a releasing position and is configured to prevent the primary locking member from moving into the unlocking position in the blocking position and to allow the primary locking member to move into the unlocking position in the releasing position, wherein the blocking member is movable from the releasing position into the blocking position by a stop on the mating plug connector housing when the plug connector housing is shifted relative to the mating plug connector housing.

2. The plug connector according to claim 1, wherein:

a free end of the primary locking member projects further from the plug connector housing in the locking position than in the unlocking position; and/or a free end of the blocking member projects further from the plug connector housing in the blocking position than in the releasing position.

3. The plug connector according to claim 1, further comprising a secondary locking device, which is configured to cause the plug connector housing to be connectable to the mating plug connector housing to establish the plug connection only when the contact member received by the plug connector housing is arranged in a predetermined position in and/or on the plug connector housing.

4. The plug connector according to claim 3, further comprising a fastening member that is fastened to the plug connector housing, wherein the blocking member is borne on the fastening member so as to be rotatable between the blocking position and the releasing position by means of a joint member; and wherein the fastening member is additionally fastened to the secondary locking device.

5. The plug connector according to claim 1, wherein the primary locking member is formed as a resiliently bendable arm that is fastened, at one end, to the plug connector housing and is movable between the locking position and the unlocking position as a result of resilient bending.

6. The plug connector according to claim 5, wherein:

the primary locking member is resiliently bent in the unlocking position such that a spring force directed toward the locking position acts on the primary locking member; and/or the primary locking member is not resiliently bent in the locking position.

7. The plug connector according to claim 1, wherein the blocking member is borne on the plug connector housing so as to be rotatable between the blocking position and the releasing position.

8. The plug connector according to claim 7, wherein:

the blocking member comprises a blocking portion configured to block the primary locking member, and an actuation portion, which is connected to the blocking portion, configured to actuate the blocking member;

the blocking portion is arranged in a gap between the primary locking member and the plug connector housing; and the actuation portion is arranged outside the gap and is rotatable from the releasing position into the blocking position by the stop on the mating plug connector housing when the plug connector housing is shifted relative to the mating plug connector housing.

9. The plug connector according to claim 8, wherein the blocking member is fork-shaped having two outer prongs as the actuation portion and a middle prong between the two outer prongs as the blocking portion.

10. The plug connector according to claim 7, further comprising a fastening member that is fastened to the plug connector housing, wherein the blocking member is borne on the fastening member so as to be rotatable between the blocking position and the releasing position by means of a joint member.

11. The plug connector according to claim 10, wherein the joint member is a film hinge.

12. The plug connector according to claim 10, wherein the fastening member is releasably fastened to the plug connector housing a latching mechanism and/or is fastenable to the plug connector housing in different positions.

13. A mating electrical plug connector, comprising:

a mating plug connector housing configured to receive at least one electrically conductive mating contact member, wherein the mating plug connector housing is connectable to a plug connector housing of an electrical plug connector by shifting the mating plug connector housing relative to the plug connector housing to establish a plug connection in which the at least one electrically conductive mating contact member is electrically connected with at least one electrically conductive contact member of the plug connector housing, wherein a primary locking member borne on the plug connector housing is movable between a locking position and an unlocking position and is configured to prevent the plug connection from releasing in the locking position and to allow the plug connection to release in the unlocking position, and wherein a blocking member borne on the plug connector housing is movable between a blocking position and a releasing position and is configured to prevent the primary locking member from moving into the unlocking position in the blocking position and to allow the primary locking member to move into the unlocking position in the releasing position; and a stop configured to move the blocking member of the plug connector from the releasing position into the blocking position when the mating plug connector housing is shifted relative to the plug connector housing.

14. The mating plug connector according to claim 13, wherein:

the mating plug connector housing comprises a housing opening for receiving at least a portion of the plug connector housing, and the stop is arranged at least in part in the housing opening; and/or the stop is rib-like.

15. An electrical plug connection system, comprising:

an electrical plug connector comprising:

a plug connector housing configured to receive at least one electrically conductive contact member;

a primary locking member, which is borne on the plug connector housing so as to be movable between a locking position and an unlocking position and is configured to prevent the plug connection from releasing in the locking position and to allow the plug connection to release in the unlocking position; and a blocking member, which is borne on the plug connector housing so as to be movable between a blocking position and a releasing position and is configured to prevent the primary locking member from moving into the unlocking position in the blocking position and to allow the primary locking member to move into the unlocking position in the releasing position; and a mating plug connector comprising:

a mating plug connector housing configured to receive at least one electrically conductive mating contact member, wherein the mating plug connector housing is connectable to the plug connector housing of the plug connector by shifting the mating plug connector housing relative to the plug connector housing to establish a plug connection; and a stop configured to move the blocking member of the plug connector from the releasing position into the blocking position when the mating plug connector housing is shifted relative to the plug connector housing;

wherein the plug connector housing of the plug connector and the mating plug connector housing of the mating plug connector are connected to establish the plug connection;

wherein the at least one electrically conductive contact member is received by the plug connector housing;

wherein the at least one electrically conductive mating contact member is received by the mating plug connector housing;

wherein the at least one electrically conductive contact member and the at least one electrically conductive mating contact member are interconnected in an electrically conductive manner; and wherein the primary locking member of the plug connector is in the locking position to prevent the plug connection from releasing, and the stop of the mating plug connector housing holds the blocking member of the plug connector in the blocking position to prevent the primary locking member from moving into the unlocking position.

* * * * *